United States Patent
Zhang et al.

(10) Patent No.: US 11,746,029 B2
(45) Date of Patent: Sep. 5, 2023

(54) METHOD FOR STARTING SINGLE-STAGE SYSTEM FOR NITROGEN REMOVAL COUPLING PARTIAL DENITRIFICATION AND ANAMMOX

(71) Applicant: NANJING UNIVERSITY, Nanjing (CN)

(72) Inventors: Xuxiang Zhang, Nanjing (CN); Depeng Wang, Nanjing (CN); Yang He, Nanjing (CN); Kailong Huang, Nanjing (CN); Lin Ye, Nanjing (CN); Bing Wu, Nanjing (CN); Hongqiang Ren, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 195 days.

(21) Appl. No.: 16/972,441

(22) PCT Filed: Nov. 9, 2019

(86) PCT No.: PCT/CN2019/105257
§ 371 (c)(1),
(2) Date: Dec. 4, 2020

(87) PCT Pub. No.: WO2021/035806
PCT Pub. Date: Mar. 4, 2021

(65) Prior Publication Data
US 2022/0348486 A1    Nov. 3, 2022

(30) Foreign Application Priority Data

Aug. 29, 2019 (CN) .......................... 201910811134.4

(51) Int. Cl.
*C02F 3/28* (2023.01)
*C02F 3/30* (2023.01)
(Continued)

(52) U.S. Cl.
CPC ................ *C02F 3/28* (2013.01); *C02F 3/307* (2013.01); *C02F 3/305* (2013.01); *C02F 3/341* (2013.01); *C02F 2101/16* (2013.01)

(58) Field of Classification Search
CPC ........ C02F 3/28; C02F 2101/16; C02F 3/341; C02F 3/305; C02F 3/307
(Continued)

(56) References Cited

FOREIGN PATENT DOCUMENTS

| CN | 106045032 B | * | 3/2019 |
| CN | 110078213 A | * | 8/2019 |
| EP | 1692441 A1 | * | 8/2006 |

OTHER PUBLICATIONS

Machine-generated English translation of CN 106045032, translated on Dec. 12, 2022.*

(Continued)

*Primary Examiner* — Fred Prince
(74) *Attorney, Agent, or Firm* — CBM PATENT CONSULTING, LLC

(57) ABSTRACT

The present invention discloses a method for starting a single-stage system for nitrogen removal coupling partial denitrification and anammox. The two nitrogen removal processes are coupled by gradually enriching denitrifying bacteria in anammox granular sludge and then activating the partial denitrification process of the functional bacteria (denitrifying bacteria). Particularly, the method comprises: inoculating anammox granular sludge in a single-stage reactor, adding an organic carbon source in gradients to enrich denitrifying bacteria and to adapt anammox bacteria, and replacing nitrites in feed with nitrates gradually to activate the partial denitrification process.

7 Claims, 3 Drawing Sheets

(51) Int. Cl.
*C02F 3/34* (2023.01)
*C02F 101/16* (2006.01)

(58) Field of Classification Search
USPC ........ 210/605, 610, 615, 616, 617, 630, 903
See application file for complete search history.

(56) References Cited

OTHER PUBLICATIONS

Machine-generated English translation of CN 110078213, translated on Dec. 12, 2022.*

* cited by examiner

METHOD FOR STARTING SINGLE-STAGE SYSTEM FOR NITROGEN REMOVAL COUPLING PARTIAL DENITRIFICATION AND ANAMMOX

TECHNICAL FIELD

The present invention relates to the field of biological nitrogen removal technology, and more specifically, to a method for starting a single-stage system for nitrogen removal coupling partial denitrification and anaerobic ammonium oxidation (anammox).

BACKGROUND

With the social economy developing, the discharge of nitrogen in wastewater is increased year by year, which poses a threat to the ecological balance and human health. At present, biological nitrogen removal technology is the most common means for pollution control over nitrogen in water. Novel anammox technology attracts an increasing attention of researchers due to the advantages of saving aeration consumption, no need for extra organic carbon source and low yield of sludge.

The anammox technology refers to a process that anammox bacteria convert nitrite into nitrogen using ammonium as an electron donor in an anaerobic or anoxic condition. Since the technology requires both ammonium nitrogen and nitrite nitrogen, such that, when applying such technology, other processes must be combined to provide a nitrite substrate. At present, the most common combined process includes a nitrosation process and a partial denitrification process. In recent years, to enhance the removal of nitrate in wastewater, it has been proposed to combine a partial denitrification process with an anammox process. In the prior art, partial denitrification and anammox of the combination process are generally implemented in two separate reactors, which increases cost in facilities, and brings difficulties in controlling, as denitrifying bacteria and anammox bacteria are competitors in substrate consumption and hardly coexist.

SUMMARY

The present invention is intended to provide a method for starting a single-stage system for nitrogen removal coupling partial denitrification and anammox. The method does not generate inhibition to anammox bacteria while enriching denitrifying bacteria, thereby causing no decrease in abundance of anammox bacteria. The present invention can realize the coexistence of denitrifying bacteria and anammox bacteria, and start the partial denitrification process by gradually changing the substrate in feed to realize the coexistence of two functional bacteria in a single-stage coupling reactor. The single-stage system of the present invention can efficiently and steadily remove ammonium and nitrates in one reactor, featuring a short starting period.

To solve the aforementioned technical problem, the present invention provides:

a method for starting a single-stage system for nitrogen removal coupling partial denitrification and anammox, comprising:

(1) inoculating anammox granular sludge into a single-stage expanded granular sludge blanket (EGSB) reactor at 4-6 kg VSS/L, wherein a nitrogen source in an initial feed in the reactor is ammonium nitrogen and nitrite nitrogen, and an organic carbon source is also added in the feed with the concentration ratio of chemical oxygen demand (COD) to total nitrogen in the feed being 0.2:1-0.25:1, promoting the enrichment of denitrifying bacteria in the anammox granular sludge; and when the total nitrogen removal rate in the reactor is maintained at 85% or above, increasing the concentration of the organic carbon in the feed in gradients such that the concentration ratio of the COD to the total nitrogen in the feed finally reaches 0.4:1-0.6:1, further enriching the denitrifying bacteria and improve the adaptation of anammox bacteria to the organics, wherein the organic carbon source in the feed is glucose or sodium acetate; and (2) maintaining the concentrations of the ammonium nitrogen and the total nitrogen in the feed in the reactor; when the total nitrogen removal rate in the reactor is maintained at 85% or above, adjusting the ratio of nitrites to nitrates in the feed to 1:1 and accordingly adjusting the concentration ratio of the COD to the total nitrogen in the feed to 0.8:1-1:1; when the total nitrogen removal rate in the reactor is maintained at 85% or above, adjusting the ratio of the nitrites to the nitrates in the feed to 0:1 such that nitrogen source in the feed is ammonium nitrogen and nitrate nitrogen, and accordingly adjusting the concentration ratio of the COD to the total nitrogen in the feed to 1.2:1-1.4:1; and when the total nitrogen removal rate in the reactor is maintained at 85% or above, the single-stage system for nitrogen removal coupling partial denitrification and anammox is established.

In step (1), in the initial feed in the reactor, the concentration ratio of ammonium nitrogen to nitrite nitrogen is 1:1.1, and the pH is 7.0-7.5.

In step (1), the anammox granular sludge comes from a conventional anammox reactor, and the mean particle diameter of the anammox granular sludge is 0.5-1.5 mm.

In the anammox inoculated sludge, the dominant anammox bacteria are *Candidatus brocadia* and *Candidatus jettenia* and the abundance sum of the dominant anammox bacteria is over 10%.

In step (1), the single-stage expanded granular sludge bed reactor is an upflow reactor having a height-diameter ratio of 10:1, the circulation ratio is 4, the hydraulic retention time is 4-6 hours, and the operation temperature is 30-33° C., and the concentration of dissolved oxygen in the reactor is 0.2-0.6 mg/L.

In the entire reaction process, the concentration of the total nitrogen in the feed in the reactor is no more than 200 mg/L, and the feed of the reactor further comprises other essential elements, including: 4-6 mg/L $NaH_2PO_4$, 40-50 mg/L $MgSO_4·7H_2O$, 200-300 mg/L $CaCl_2·2H_2O$, 0.8-1.2 g/L $KHCO_3$ and 20-40 mg/L $FeSO_4$.

In step (2), after the single-stage system for nitrogen removal coupling partial denitrification and anammox is started, the concentration ratio of the organic carbon source to the nitrate nitrogen in the feed is 2.5:1-2.6:1, that is, the C/N ratio is 2.5-2.6:1.

Beneficial effects: The method disclosed herein can realize the coexistence of the two functional bacteria in a single-stage coupling reactor. The present invention utilizes organic substance of low concentration to domesticate the anammox granular sludge and enrich the denitrifying bacteria in the granular sludge, thereby avoiding the inhibition of high-concentration organic substance on the anammox bacteria and the decrease of the abundance of the anammox bacteria (decrease of the abundance of the anammox bacteria will lead to a longer starting period of the reactor), and improving the tolerance of the reactor to the organic substance. Meanwhile, by changing the ratio of the nitrite to the nitrate in the feed, the present invention directly improves the partial denitrification capacity of the denitrifying bacteria in the reactor without changing the population structure of the denitrifying bacteria, thereby shortening the period required by a succession process of the microbial population and finally realizing the synchronous and efficient removal of nitrate and ammonium nitrogen in wastewater. In addition, less organic carbon is required as compared with a conventional denitrification process. The single-stage coupling reactor of the present invention has good application prospect.

DETAILED DESCRIPTION

The technical solutions of the present invention are further described in detail below with reference to drawings and specific embodiments.

Figure 1:
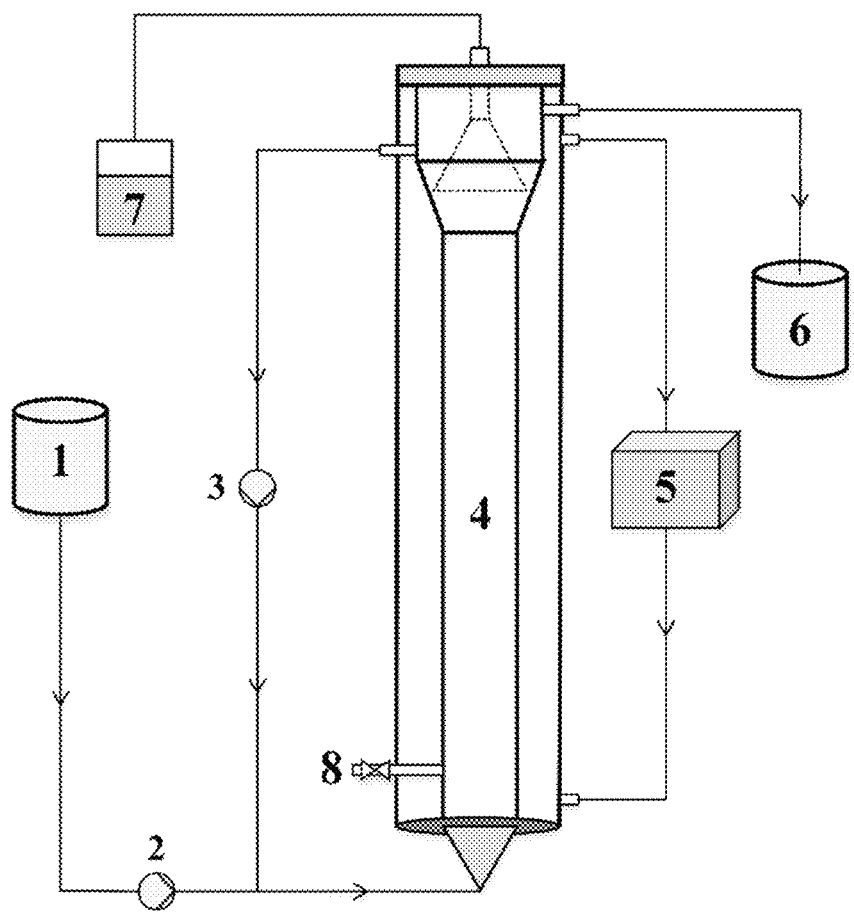
FIG. 1 is a schematic illustrating the operation of the single-stage EGSB reactor according to the present invention.

The single-stage system for nitrogen removal coupling partial denitrification and anammox of the present invention uses a single-stage EGSB reactor as a reactor body with an effective volume of 1 L. The reactor body 4 comprises a sludge sampling port 8, a feed inlet, a discharge outlet, a circulation port and an exhaust port; the feed inlet of the reactor body 4 is connected to an external feed tank 1 through an feed peristaltic pump 2, the discharge outlet of the reactor body 4 is connected to an external discharge tank, the exhaust port of the reactor body 4 is connected to an exhaust pipe 7, and the circulation port of the reactor body 4 realizes, through a circulation peristaltic pump 3, the circulation of the reaction liquid in a certain ratio. Feeding of the reactor employs a peristaltic pump 2 at the bottom, and the specific operation principle is shown in FIG. 1. The circulation ratio of the EGSB reactor is 4, the hydraulic retention time is 6 hours, and the operation temperature of the reactor body 4 is controlled at 30-33° C. through a thermostatic circulation system 5.

Figure 2:
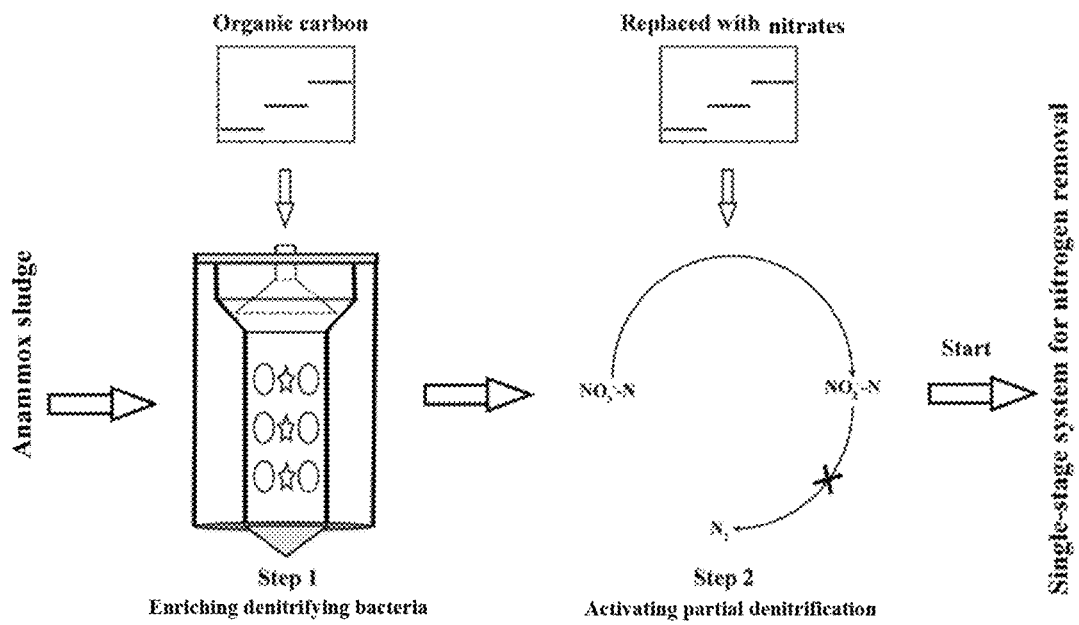
FIG. 2 is a flowchart illustrating the establishment of the single-stage EGSB reactor according to the present invention.

FIG. 2 shows the establishment of the single-stage system for nitrogen removal coupling partial denitrification and anammox disclosed herein. The two nitrogen removal processes are coupled by gradually enriching denitrifying bacteria in anammox granular sludge and then activating the partial denitrification process of the functional bacteria (denitrifying bacteria). Particularly, the method comprises: inoculating anammox granular sludge in a single-stage reactor, adding an organic carbon source in gradients to enrich denitrifying bacteria and to adapt anammox bacteria, and replacing nitrites in feed with nitrates gradually to activate the partial denitrification process. The single-stage system for nitrogen removal coupling partial denitrification and anammox is successfully started when the total nitrogen removal rate in the reactor is maintained at 85% or above.

One embodiment of starting the single-stage system for nitrogen removal coupling partial denitrification and anammox according to the method disclosed herein is described below:

0.6 L of the anammox granular sludge was inoculated to the single-stage EGSB with an initial inoculation amount of 4 kg VSS/L. The inoculated anammox sludge came from an anammox granular sludge reactor steadily operating in the laboratory, with a mean particle diameter of the inoculated sludge being 1.0-1.5 mm. In the inoculated sludge, dominant anammox bacteria are *Candidatus brocadia* and *Candidatus jettenia*, of which the abundance sum is over 10%.

pH of the feed in the EGSB reactor was maintained at 7.0-7.5, the concentration of ammonium nitrogen in the initial feed was 80 mg/L, the concentration of nitrite nitrogen in the initial feed was 90 mg/L and the concentration of nitrate nitrogen in the initial feed was 5 mg/L. The concentration ratio of the ammonium nitrogen in the feed to the nitrite nitrogen in the feed was adjusted to 1:1.1, and the organic carbon source in the initial feed was sodium acetate with the concentration of COD being 40 mg/L. In addition, the feed of the reactor further comprised other trace elements, including 4 mg/L $NaH_2PO_4$, 40 mg/L $MgSO_4 \cdot 7H_2O$, 200 mg/L $CaCl_2 \cdot 2H_2O$, 1 g/L $KHCO_3$ and 30 mg/L $FeSO_4$.

Figure 3:
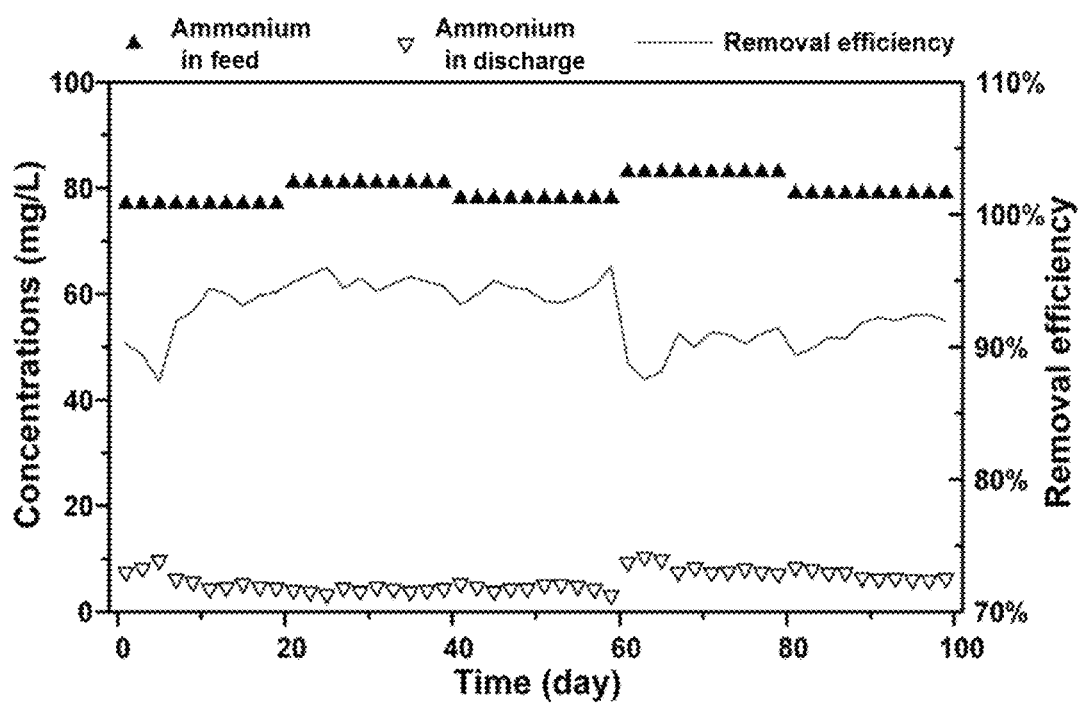
FIG. 3 is a diagram illustrating the removal efficiency of ammonium nitrogen during the starting of the single-stage EGSB reactor according to the present invention.
Figure 4:
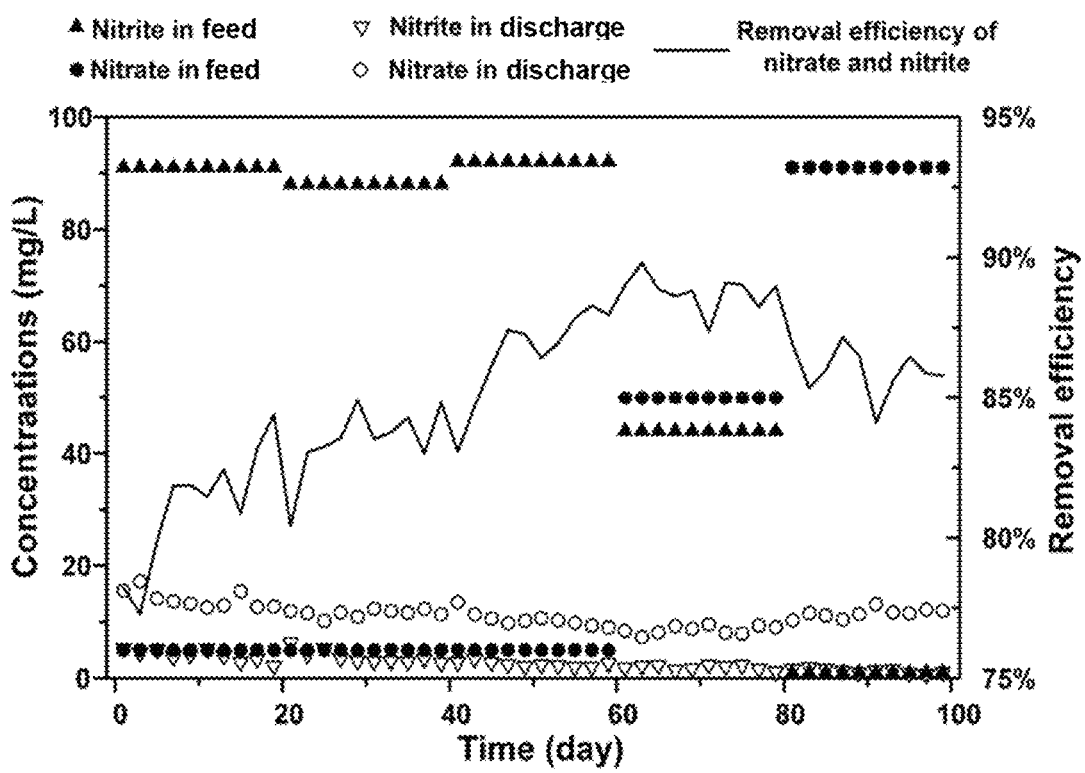
FIG. 4 is a diagram illustrating the removal efficiency of two types of nitrogen during the starting of the single-stage EGSB reactor according to the present invention.
Figure 5:
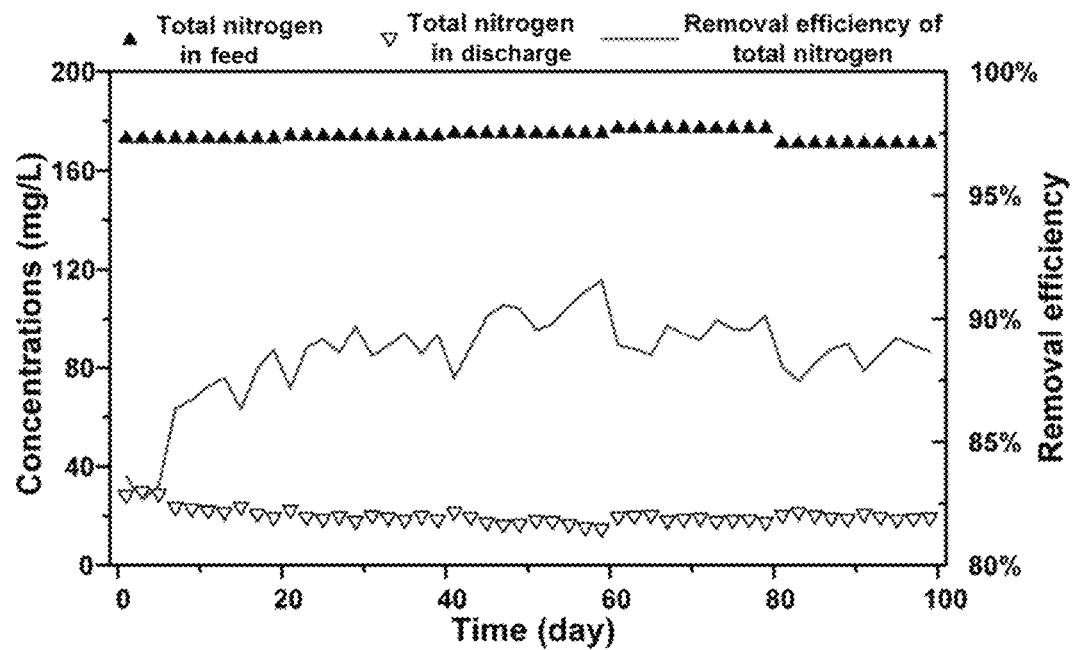
FIG. 5 is a diagram illustrating the removal efficiency of total nitrogen during the starting of the single-stage EGSB reactor according to the present invention.

Quality parameters of the discharge were analyzed every other day. The specific nitrogen removal efficiency of the reactor is shown in FIGS. 3-5. When the removal rate of total nitrogen in the reactor was maintained at 85% or above, the concentration of the organic carbon source in the feed was increased in gradients, and each stage (gradient) lasted for 20 days (the operation period of each stage and whether to proceed to the next operation stage were based on whether the removal rate of the total nitrogen of the reactor was maintained at 85% or above). The details are shown in Table 1. When the process proceeded to the $3^{rd}$ stage, the concentration ratio of the COD in the feed to the total nitrogen in the feed reached 0.5:1, and the denitrifying bacteria are further enriched.

TABLE 1

Quality characteristics of feed in each stage

| | | Concentration of feed (mg/L) | | | | |
|---|---|---|---|---|---|---|
| Stage | Time (day) | $NH_4^+$—N | $NO_2^-$—N | $NO_3^-$—N | COD | C/N |
| 1 | 1-20 | 80 | 90 | 5 | 40 | 0.24 |
| 2 | 21-40 | 80 | 90 | 5 | 60 | 0.35 |
| 3 | 41-60 | 80 | 90 | 5 | 80 | 0.47 |
| 4 | 61-80 | 80 | 45 | 50 | 150 | 0.88 |
| 5 | 81-100 | 80 | 0 | 90 | 230 | 1.35 |

When the process proceeded to the $4^{th}$ stage, the concentrations of ammonium nitrogen and total nitrogen in the feed was maintained, the concentrations of nitrite nitrogen in the feed and nitrate nitrogen in the feed were adjusted to 45 mg/L and 50 mg/L respectively, the concentration of the COD in the feed was adjusted to 150 mg/L, and nitrites in the feed were partially replaced with nitrates to activate the partial denitrification activity of the denitrifying bacteria, that is, the denitrifying bacteria only converted nitrates into nitrites, and the nitrites were further utilized by the anammox bacteria. After the nitrogen removal efficiency of the reactor reached a steady state (i.e., the removal rate of total nitrogen in the EGSB reactor is maintained at 85% or above), nitrites in the feed were completely replaced with nitrates and accordingly in the 5$^{th}$ stage, and the concentration of the COD of the feed was adjusted to 230 mg/L, to comprehensively activate the partial denitrification activity so as to promote the partial denitrification process, providing the nitrite substrate for anammox process. When the removal rate of total nitrogen in the EGSB reactor was maintained at 85% or above, the single-stage system coupling partial denitrification and anammox was successfully established.

Figure 6:
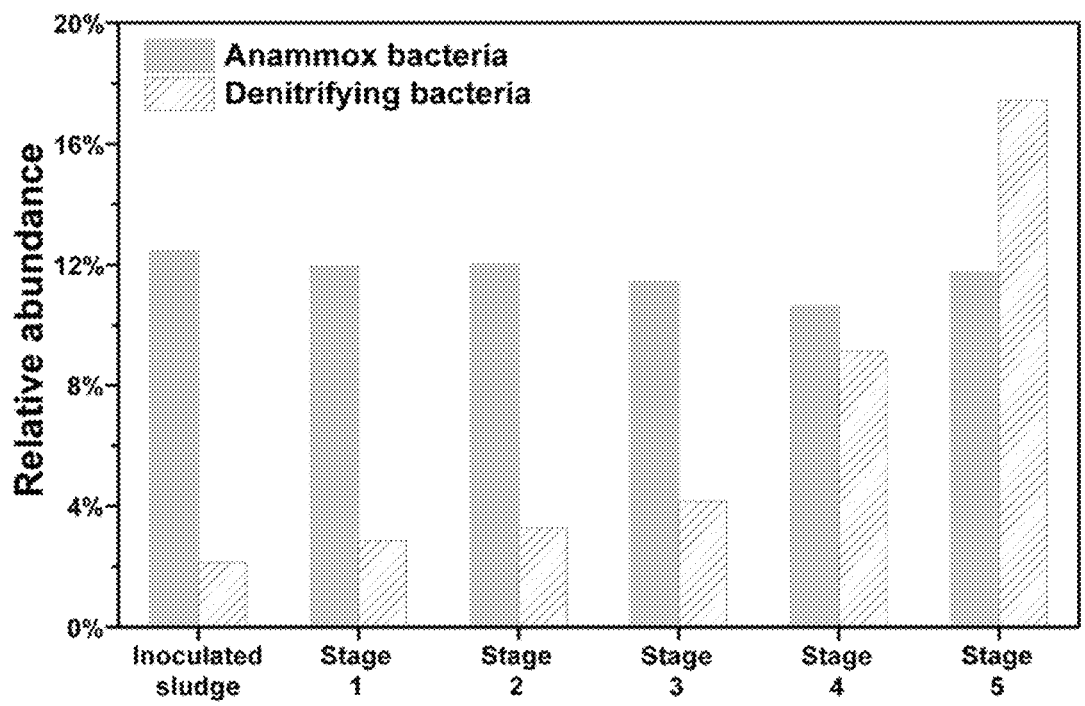
FIG. 6 is a diagram illustrating the abundance of the anammox bacteria and denitrifying bacteria during the starting of the single-stage EGSB reactor according to the present invention.

See FIG. 6 for trends of the abundance of the anammox bacteria and the denitrifying bacteria in the reactor. It is obvious from FIG. 6 that the method disclosed herein can realize the coexistence of anammox bacteria and denitrifying bacteria, which breaks through the technical challenge that partial denitrifying bacteria and anammox bacteria hardly coexist in an single-stage reactor and realizes the coupling of partial denitrification and anammox processes for simultaneous removing ammonium and nitrates in wastewater, thereby improving the removal efficiency of total nitrogen in wastewater.

What is claimed is:

1. A method for starting a single-stage system for nitrogen removal coupling partial denitrification and anammox, comprising:
   (1) inoculating anammox granular sludge into a single-stage expanded granular sludge blanket reactor at 4-6 kg VSS/L, wherein a nitrogen source in an initial feed in the reactor is ammonium nitrogen and nitrite nitrogen, and an organic carbon source is also added in the feed with a concentration ratio of chemical oxygen demand (COD) to total nitrogen in the feed being 0.2:1-0.25:1; and when a total nitrogen removal rate in the reactor is maintained at 85% or above, increasing the concentration of the organic carbon source in the feed in gradients such that the concentration ratio of the COD to the total nitrogen in the feed reaches 0.4:1-0.6:1, wherein the organic carbon source in the feed is glucose or sodium acetate; and
   (2) maintaining the concentrations of the ammonium nitrogen and the total nitrogen in the feed in the reactor; when the total nitrogen removal rate in the reactor is maintained at 85% or above, adjusting a ratio of nitrites to nitrates in the feed to 1:1 and accordingly adjusting the concentration ratio of the COD to the total nitrogen in the feed to 0.8:1-1:1; when the total nitrogen removal rate in the reactor is maintained at 85% or above, adjusting the ratio of the nitrites to the nitrates in the feed to 0:1 such that a nitrogen source in the feed is ammonium nitrogen and nitrate nitrogen, and accordingly adjusting the concentration ratio of the COD to the total nitrogen in the feed to 1.2:1-1.4:1; and when the total nitrogen removal rate in the reactor is maintained at 85% or above, the single-stage system for nitrogen removal coupling partial denitrification and anammox is started.

2. The method according to claim 1, wherein in step (1), in the initial feed in the reactor, the concentration ratio of ammonium nitrogen to nitrite nitrogen is 1:1.1, and the pH is 7.0-7.5.

3. The method according to claim 1, wherein in step (1), the anammox granular sludge comes from a conventional anammox reactor, and the mean particle diameter of the anammox granular sludge is 0.5-1.5 mm.

4. The method according to claim 1, wherein in the anammox inoculated sludge, a dominant anammox bacteria are *Candidatus brocadia* and *Candidatus jettenia*, and the abundance sum of the dominant anammox bacteria is over 10%.

5. The method according to claim 1, wherein in step (1), the single-stage expanded granular sludge blanket reactor is an upflow reactor having a height-diameter ratio of 10:1, a circulation ratio is 4, a hydraulic retention time is 4-6 hours, and an operation temperature is 30-33° C., and a concentration of dissolved oxygen in the reactor is 0.2-0.6 mg/L.

6. The method according to claim 1, wherein in the method, the concentration of the total nitrogen in the feed in the reactor is no more than 200 mg/L, and the feed in the reactor further comprises other essential elements, including: 4-6 mg/L $NaH_2PO_4$, 40-50 mg/L $MgSO_4 \cdot 7H_2O$, 200-300 mg/L $CaCl_2 \cdot 2H2O$, 0.8-1.2 g/L $KHCO_3$ and 20-40 mg/L $FeSO_4$.

7. The method according to claim 1, wherein in step (2), after the single-stage system for nitrogen removal coupling partial denitrification and anammox is started, the concentration ratio of the organic carbon to the nitrate nitrogen in the feed is 2.5:1-2.6:1.

* * * * *